(12) United States Patent
Hoogerbrugge et al.

(10) Patent No.: US 12,717,904 B2
(45) Date of Patent: Aug. 25, 2026

(54) METHOD AND SYSTEM FOR PROTECTING A MACHINE LEARNING MODEL AGAINST EXTRACTION

(71) Applicant: NXP B.V., Eindhoven (NL)

(72) Inventors: Jan Hoogerbrugge, San Jose, CA (US); Wilhelmus Petrus Adrianus Johannus Michiels, San Jose, CA (US)

(73) Assignee: NXP B.V., Eindhoven (NL)

( * ) Notice: Subject to any disclaimer, the term of this patent is extended or adjusted under 35 U.S.C. 154(b) by 265 days.

(21) Appl. No.: 18/067,043

(22) Filed: Dec. 16, 2022

(65) Prior Publication Data

US 2024/0202323 A1 Jun. 20, 2024

(51) Int. Cl.
*G06F 21/55* (2013.01)
*G06N 5/04* (2023.01)
*G06V 10/764* (2022.01)
*G06V 10/774* (2022.01)

(52) U.S. Cl.
CPC ............ *G06F 21/554* (2013.01); *G06N 5/04* (2013.01); *G06V 10/764* (2022.01); *G06V 10/774* (2022.01); *G06F 2221/034* (2013.01)

(58) Field of Classification Search
CPC .. G06F 21/554; G06V 10/774; G06V 10/764; G06N 5/04
USPC ........................................................ 726/23
See application file for complete search history.

(56) References Cited

U.S. PATENT DOCUMENTS 10,769,310 B2 9/2020 Michiels et al.
10,824,721 B2 11/2020 Kesarwani et al.
11,100,222 B2 8/2021 Joye et al.
11,321,456 B2 5/2022 Derks et al.
11,468,291 B2 10/2022 Michiels et al.
11,501,212 B2 11/2022 Van Vredendaal et al.
12,050,669 B2 * 7/2024 Sankaranarayanan ...................... G06F 21/577
2020/0327443 A1 10/2020 Van Vredendaal et al.
2023/0274003 A1 * 8/2023 Liu ........................ G06N 3/094 726/26
2023/0289604 A1 * 9/2023 Chan ..................... G06F 21/577

FOREIGN PATENT DOCUMENTS

CN 112334876 A * 2/2021 ............... G06F 9/44

OTHER PUBLICATIONS

Anonymous, "Motion estimation," Wikipedia, retrieved on Jul. 25, 2023, 4 pages, Retrieved from the internet [URL: https://en.wikipedia.org/wiki/Motion_estimation].

(Continued)

*Primary Examiner* — Liang Che A Wang

(57) ABSTRACT

Systems and methods for protecting a Machine Learning (ML) model from extraction have been described. In an illustrative, non-limiting embodiment, a method may include: obtaining a plurality of input samples usable as part of an inference operation, wherein the inference operation is performed through execution of a machine learning (ML) model. The method may further include obtaining a plurality of outputs from the inference operation. The method may further include detecting a temporal inconsistency among at least one of: (a) the plurality of input samples, or (b) the plurality of outputs. Finally, the method may further include identifying an attempt to extract the ML model, based at least in part upon the determination.

20 Claims, 7 Drawing Sheets

(56) References Cited

OTHER PUBLICATIONS

Anonymous, "Anomaly detection," Wikipedia, retrieved on Jul. 25, 2023, 7 pages, Retrieved from the internet [URL: https://en.wikipedia.org/wiki/Anomaly_detection].

Florian Tramer, et al., "Stealing Machine Learning Models via Prediction APIs," arXiv:1609.02943v2 [cs.CR], This paper is included in the Proceedings of the 25th USENIX Security Symposium, Aug. 10-12, 2016, Austin, TX ISBN 978-1-931971-32-4, arXiv:1609.02943v2 [cs.CR], Oct. 3, 2016, 19 pages, publisher USENIX Association.

Tribhuvanesh Orekondy, et al., "Knockoff Nets: Stealing Functionality of Black-Box Models," 2019 IEEE/CVF Conference on Computer Vision and Pattern Recognition (CVPR), Jun. 15-20, 2019, Long Beach, CA, DOI: 10.1109/CVPR.2019.00509, arXiv:1812.02766v1 [cs.CV], Dec. 6, 2018, 17 pages, publisher IEEE.

Jacson Rodrigues Correia-Silva, et al., "Copycat CNN: Stealing Knowledge by Persuading Confession with Random Non-Labeled Data," 2018 International Joint Conference on Neural Networks (IJCNN), Jul. 8-13, 2018, Rio de Janeiro, Brazil, DOI: 10.1109/IJCNN.2018.848959, arXiv:1806.05476v1 [cs.CV], Jun. 14, 2018, 8 pages, publisher IEEE.

Mika Juuti, et al., "PRADA: Protecting Against DNN Model Stealing Attacks," arXiv:1805.02628v5 [cs.CR], Mar. 31, 2019, 17 pages, publisher 2019 IEEE European Symposium on Security and Privacy (EuroS&P), Stockholm, Sweden.

Wilhelmus Petrus Adrianus Johannus Michiels, et al., "Method for Protecting a Machine Learning Model From Being Copied," U.S. Appl. No. 18/051,531, filed Nov. 1, 2022.

* cited by examiner

TEMPORAL CONSISTENT

202

TEMPORAL INCONSISTENT

204

METHOD AND SYSTEM FOR PROTECTING A MACHINE LEARNING MODEL AGAINST EXTRACTION

FIELD

This disclosure relates generally to machine learning, and more particularly, to a method for protecting a machine learning model against extraction.

BACKGROUND

In simple terms, "Machine Learning" (ML) refers to a subset of Artificial Intelligence (AI) technologies usable to build and maintain computer systems capable of "learning." As a general proposition, ML algorithms are built upon sample data, also referred to as "training data," to make predictions or decisions-without being explicitly programmed to do so.

Examples of applications suitable for ML include, but are not limited to: medicine, email filtering, speech recognition, agriculture, computer vision, etc.

In most applications, ML models may be classified by how they are trained. Supervised learning, unsupervised learning, semi-supervised learning, and reinforcement learning are a few examples of training techniques.

The effectiveness of an ML model may be influenced by its accuracy, execution time, storage requirements, and the quality of the training data. As such, the expertise, time, and expense required for compiling a representative training set of data, labelling the data results in the training data, and the ML model obtained from the training data, are all valuable assets.

In recent years, however, ML model attacks have become a problem. "Model extraction," for example, is a form of attack that results in a near identical copy of the ML model being reproduced by an adverse party.

Particularly, when ML is provided as a service (e.g., a cloud service), an attacker may only have access to the inputs and outputs of the ML model. To extract the model when the ML model is provided as a service, valid queries are provided to the model and the resulting output is compiled.

In such attacks, the attacker does not have to provide so-called problem-domain (PD) inputs to the ML model. The attacker can also copy the ML model using non-problem-domain (NPD) inputs. Even when the attacker is only given access to its inputs and outputs, an ML model may be copied relatively easily.

Once an attacker has copied the ML model, the ML model may be illegitimately used and monetized. Also, adversaries can apply model extraction to gain white-box access and thereby develop other attacks, such as attacks that can fool the original model to mis-predict.

Countermeasures exist to protect an ML model from being extracted by an attacker. As the inventors hereof have recognized, however, conventional countermeasures require the ML model to be modified, which can reduce the accuracy of the ML model.

BRIEF DESCRIPTION OF THE DRAWINGS

The present invention(s) are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
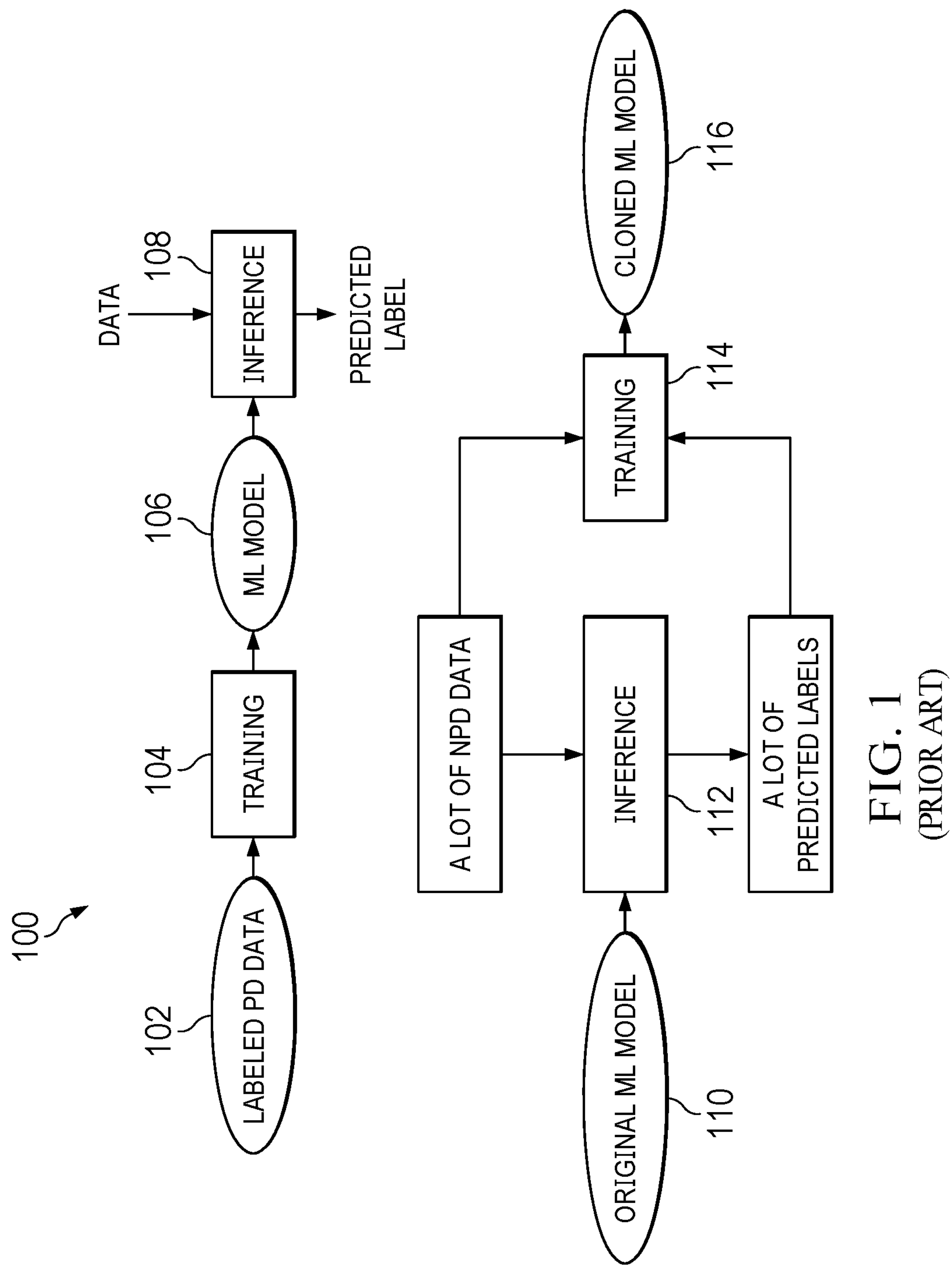
FIG. 1 depicts normal operation of an ML model training and classification, as well as the extraction of the ML model by an attacker, according to some embodiments.

Systems and methods for protecting a Machine Learning (ML) model against extraction attacks are described. In an embodiment, an ML model may be provided to generate an output in response to receiving an input sample. The input sample may be an image and the output may be a classification of the image. The ML model may be trained to provide a correct classification for a normal-type of input sample with relatively high reliability.

A normal-type of input sample (problem domain) may be an input sample that might be input by a legitimate user making use of the ML model in a way the model was intended to be used. A potentially adversarial-type of input sample (non-problem domain) may be from, for example, samples that are randomly chosen or unrelated to the intended use of the ML model. To prevent an attacker from cloning, or making an illegitimate copy, of the trained ML model, it is important to be able to detect and differentiate a normal-type of input sample from an adversarial-type of input sample.

ML models learn a function which correctly maps a given input value to an output value using training data. The learned function may be used to categorize new data, for example, photos or pictures of dogs and cats. After training, the ML model may be used in inference operation to make predictions about input samples it receives. ML models may be any type of ML model, depending on the embodiment, such as for example, a neural network, decision tree, random forest, or support vector machine. An ML model receives input samples labeled "INPUT", classifies the input samples by category and provides a classification or category of the input sample, in some embodiments.

The normal type of valid input sample that correctly fits within one of the categories the model is trained for may be referred to as a "problem domain" input sample. In contrast, an input sample that is unrelated to the intended use of the model may be referred to as a "non-problem domain" input sample.

A non-problem domain input is not expected to be processed correctly by an ML algorithm. For example, if an ML model classifies images of cats and dogs, a possible non-problem domain input would be an image of a giraffe, which is neither a dog or cat. Generally, an ML model cannot distinguish from problem domain input samples and non-problem domain input samples and will attempt to provide an output value for every input sample that is received.

In an ML model implemented remotely, such as in the cloud or in a black box, access is only available to the inputs and outputs of the model. A goal of model extraction, or model cloning, is to extract the functionality of the ML model as accurately as possible by providing queries to the ML model and storing the returned outputs. The resulting input/output pairs of data may be used to train another ML model which in terms of functionality is close to the original model. Hence, the cloned model is likely to work correctly for the original input values.

A legitimate user is expected to mostly input samples that fall within a problem domain. In a cloning attack, the attacker may use a large number of non-problem domain input samples.

There are various methods for an attacker to steal an ML model. One method is an API attack where an attacker feeds the inference process with a data stream $x_i$ and captures the corresponding inference results $y_i$. Typically, a few hundred thousand, or million, $x_i$, $y_i$ pairs need to be collected. With these pairs the attacker can train a new model. This new model is then very almost an identical clone of the original model. With sufficient $x_i$, $y_i$ pairs and a properly configured training process, the cloned model can have a similar accuracy as the original ML model.

Note that the $x_i$ data does not have to come from the domain for which the ML model under attack is intended to be used for. Some embodiments of the disclosed systems and methods for protecting an ML model against extraction prevent such an API attack.

Detecting an adversarial-type of input sample, in some embodiments, may rely on the observation that the inputs $x_i$ for an API attack will come from a data set (such as ImageNet) where there is no relation between successive $x_i$ values. In practice, when the model is not under attack, the input for inferences may typically come from a camera or a sensor. When the model is not under attack, there will usually be a strong relation between successive $x_i$ values. This may be called "temporal consistency."

For example, if $x_i$ is an image then $x_{i+1}$ is very likely a similar image with the same objects in it, where some of the objects may have moved within the image. As another example, it might be that the camera has moved and that therefore all objects within image $x_{i+1}$ have moved with respect to image $x_i$.

However, if an API attack is applied on an ML model, then the input is typically not temporally consistent. For example, during an attack, the image $x_{i+1}$ will probably be very different from image $x_i$. To thwart an attack temporal consistency may be measured on the inputs $x_i$. However, temporal consistency can not only be measured on the inputs $x_i$, but it can also be measured on the outputs $y_i$.

Some embodiments of the systems and methods described herein may measure temporal consistency, and then count how often the temporal consistency is below a certain threshold. If the temporal consistency is below the certain threshold too often, then the system concludes that it is under attack. Once the system concludes it is under attack, then it can react in various ways.

After a system concludes that it is under attack, then it can take a responsive action in some embodiments, such as by, for example, lowering the accuracy of the inference, lowering the speed of the inference, or signalling a backend service that it under attack. For example, in response to detecting an NPD input sample that is not temporally consistent, the ML system may return a random output instead of a correct PD output.

To prevent an attacker from learning that random outputs are being returned instead of the real outputs, the random outputs may be "smoothed" so that a difference in the values of generated consecutive random outputs is reduced. This prevents the random outputs from being wildly different from one random output to the next and thus alerting an attacker.

As another example, to make copying of the model more difficult, the prediction speed of the ML model may be slowed in some embodiments for queries to the model that are temporally inconsistent, such that they are outside of the problem domain distribution. Slowing the output predictions will make extraction of the model take significantly longer, thus increasing the effort and time to make a cloning attack. The more temporally inconsistent the input is, for example, the longer an attack will take. In many cases, this can make the effort not worthwhile for the attacker.

By detecting temporal (in)consistency as described herein, a trained ML model may be protected from extraction, or cloning, by an attacker without significantly impacting the functioning of the protected ML model for problem domain input samples. Also, the ML model does not require ML model architecture changes to provide the protection. In addition, no retraining of the ML model is required.

FIG. 1 depicts normal operation of an ML model (106) training and classification, as well as the extraction of the ML model (110) by an attacker. The ML model (106) learns a function through training (104) which correctly maps a given input value to an output value. The ML model (106) is trained using labeled problem-domain (PD) training data (102).

After training, the ML model (106) may be used in inference operation (108) to make predictions about input samples it receives. The learned function may be used to categorize new data in the inference operation (108). In an inference operation (108), new data is input into the trained ML model (106), and a predicted label is output by the ML model.

Still referring to FIG. 1, an attacker can feed the inference process (112) of the original ML model (110) with an NPD data stream $x_i$. The attacker can capture a lot of predicted labels as the corresponding inference results $y_i$. Typically, a few hundred thousand, or million, $x_i$, $y_i$ pairs need to be collected. With these pairs the attacker can train (114) a new model in the training block. This new cloned ML model (116) is then very almost an identical clone of the original model (110). With sufficient $x_i$, $y_i$ pairs and a properly configured training process, the cloned ML model (116) can have a similar accuracy as the original ML model (110). Note that the $x_i$ data does not have to come from the domain for which the ML model under attack is intended to be used for, but may be NPD data.

Figure 2:
FIG. 2 depicts two examples of temporally consistent and temporally inconsistent images, according to some embodiments.

FIG. 2 shows two examples (200) of temporally consistent (202) and temporally inconsistent images (204). The top of FIG. 2 shows examples of images that are temporally consistent (202). In practice, when the model is not under attack, the input for inferences may typically come from a camera or a sensor.

When the model is not under attack, there will usually be a strong relation between successive $x_i$ values. For example, referring to the top of FIG. 2, if $x_i$ is an image then $x_{i+1}$ is very likely a similar image with the same objects in it, where some of the objects may have moved within the image. As another example, it might be that the camera has moved and that therefore all objects within image $x_{i+1}$ have moved with respect to image $x_i$.

However, if an API attack is applied on an ML model, then the input is typically not temporally consistent. The bottom of FIG. 2 shows examples of images that are temporally inconsistent (204). For example, during an attack, the image $x_{i+1}$ will probably be very different from image $x_i$. With temporally inconsistent data (204), the inputs $x_i$ for an API attack will come from a data set (such as ImageNet) where there is no relation between successive $x_i$ values.

Figure 3:
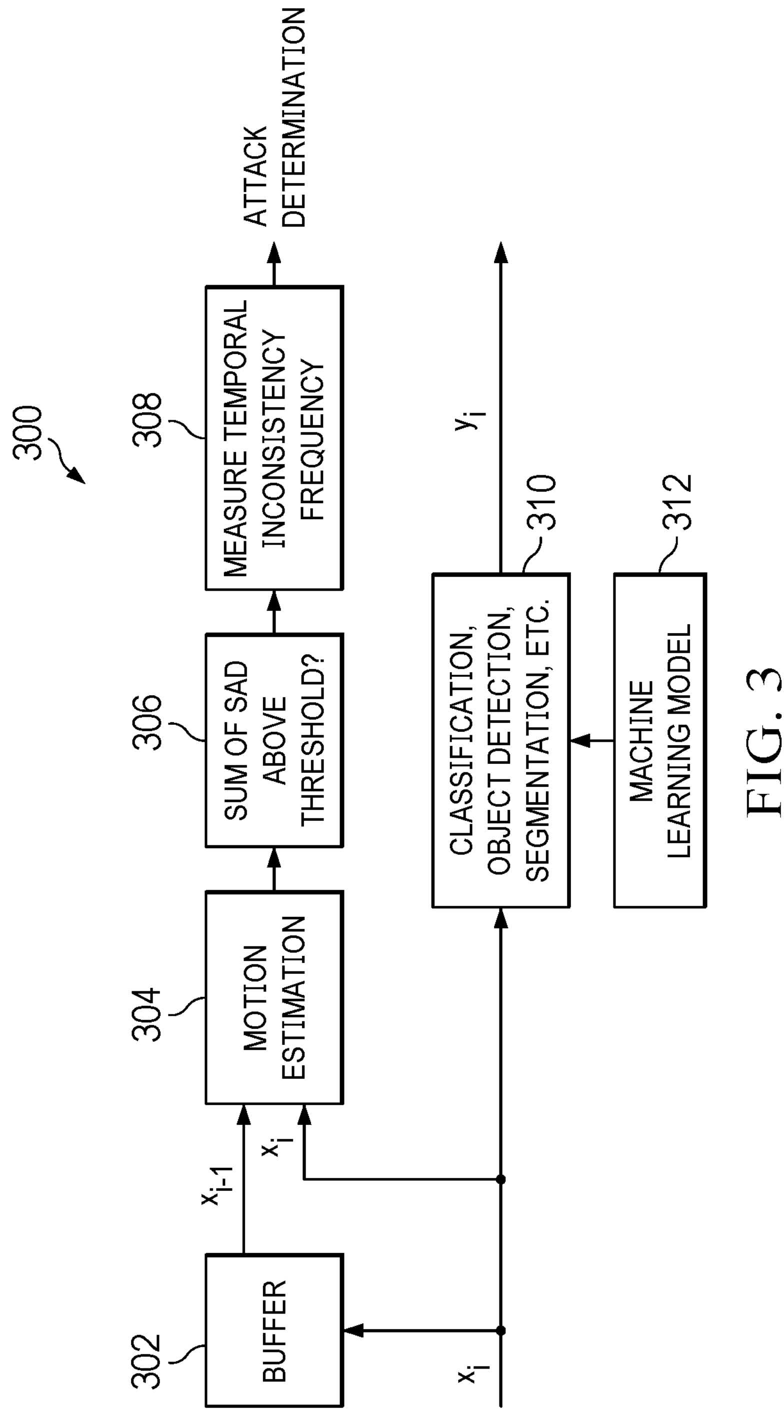
FIG. 3 depicts a first set of embodiments for protecting an ML model against extraction by applying motion estimation on input $x_i$.

FIG. 3 depicts a first set of embodiments for protecting an ML model (312) against extraction by applying motion estimation (304) on input $x_i$. Particularly, FIG. 3 depicts the ML model (312) that is being protected with these sets of embodiments. The ML model (312) receives input $x_i$ and provides a classification, object detection, segmentation, or other type of ML inference (310) on the input $x_i$ to produce an output $y_i$.

However, in addition to providing the input $x_i$ to the ML model's inference operation (310), the input $x_i$ is also provided to a buffer (302) and a motion estimation component (304). The motion estimation component (304) obtains the input $x_i$ as well as the previous input $x_{i-1}$ from the buffer (302). The motion estimation component (304) then estimates the motion of objects between the two inputs.

Motion estimation is a video processing technique that detects motion of pixel blocks in successive images by determining motion vectors that describe the transformation from one 2D image to another, usually from adjacent frames in a video sequence. Although the motion is in three dimensions most of the time, motion estimation estimates the motion of these images that are a projection of the 3D scene onto a 2D plane. Motion estimation can use motion vectors to approximate motion in the image. The motion vectors may relate to the whole image (global motion estimation) or specific parts, such as rectangular blocks, arbitrary shaped patches or even per pixel. The motion vectors may be represented by a translational model, in some embodiments. In other embodiments, the motion vectors may be represented by many other models that can approximate the motion of a real video camera, such as rotation and translation in all three dimensions as well as zoom.

Figure 4:
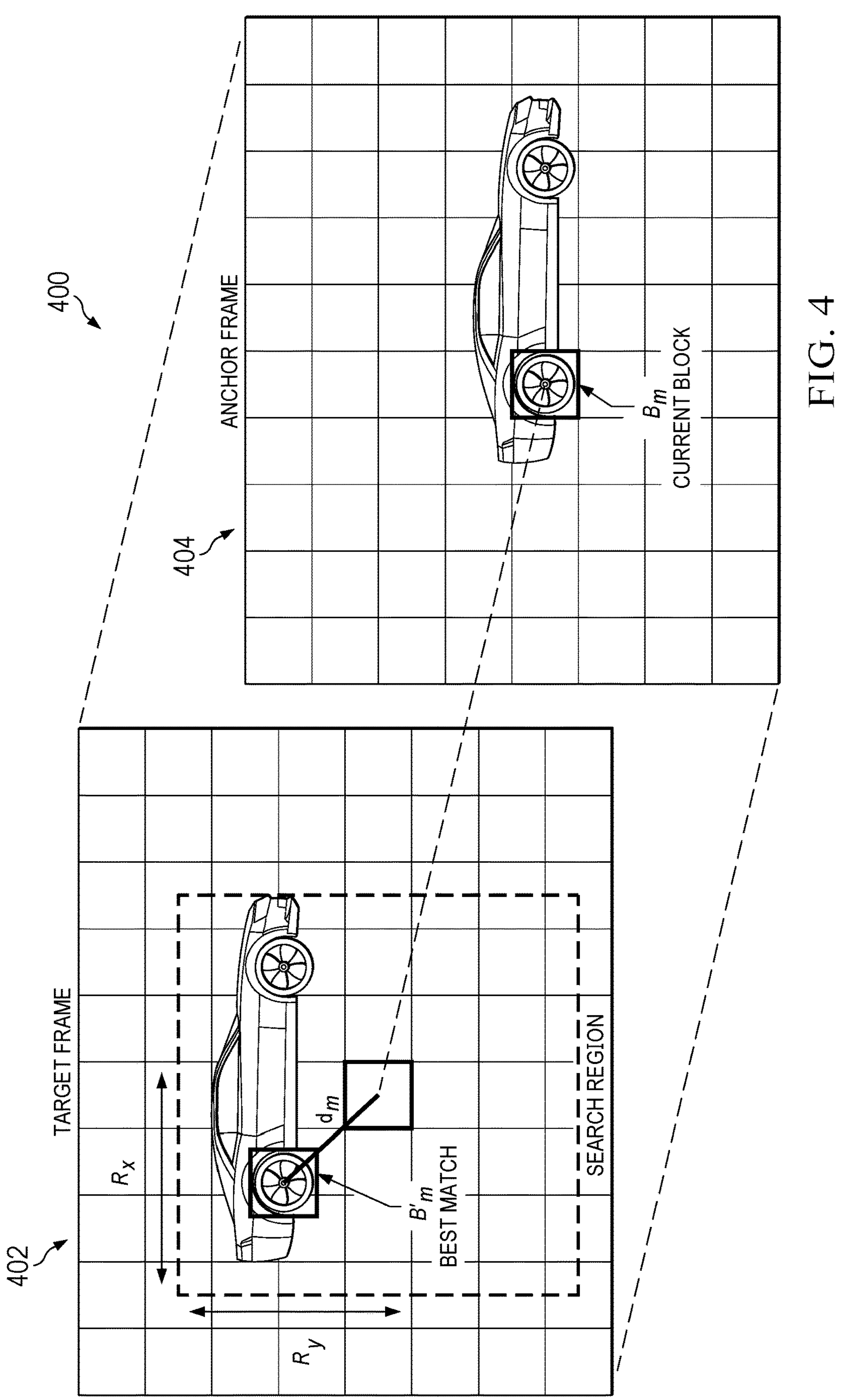
FIG. 4 depicts some details of motion estimation and applying motion estimation to images, according to some embodiments.

Motion estimation may be used in video compression and video improvement algorithms. FIG. 4 depicts some details (400) of motion estimation and applying motion estimation to images, according to some embodiments. In this example, FIG. 4 shows a 160×128 pixels image (402, 404) broken into 16×16 pixel blocks. There are a total of 80 16×16 pixel blocks in the 160×128 pixels image.

Moreover, FIG. 4 depicts an anchor frame (404) with the previous image $x_{i-1}$, and a target frame (402) with the current image $x_i$. A motion estimation algorithm is attempting to estimate the motion between the previous image (404) and the current image (402). For every 16×16 pixel block in $x_i$ a motion estimation algorithm determines where it most likely came from in the previous image $x_{i-1}$. The 16×16 pixel blocks is used for this example, but motion estimation algorithms don't have to work with 16×16 pixel blocks. Motion vectors may relate to the whole image (global motion estimation) or specific parts, such as rectangular blocks, arbitrary shaped patches or even per pixel, depending on the embodiment. Therefore, the specifics of this example should not be construed as limiting.

For blocks in the target frame $x_i$, motion estimation determines how well a block in $x_i$ matches with a block in the previous anchor frame $x_{i-1}$, in some embodiments. For example, for the current block block $\beta_m$ in the previous anchor frame (404), motion estimation searches a search region for a similar block of 16×16 pixels in the target frame (402). The search region may be a certain amount of distance in the target frame around the previous position of block $\beta_m$ in the previous anchor frame. For example, in FIG. 4, the search region for the target frame (402) is $R_x$ in the horizontal direction and $R_y$ in the vertical direction from the edges of the previous position of block $\beta_m$ in the anchor frame (404).

In the example of FIG. 4, motion estimation has found a block $\beta'_m$ in the target frame (402) that is the best match for block $\beta_m$ in the previous anchor frame (404). Motion vector $d_m$ measures the direction and magnitude of movement of block $\beta'_m$ in the target frame (402) from the initial block $\beta_m$ in the anchor frame (404). Note that in the embodiments of FIG. 4, block $\beta'_m$ in the target frame (402) does not necessarily line up with the boundaries of the predetermined 16×16 blocks of pixels in the target frame (402). In some embodiments the best match block $\beta'_m$ in the target frame might correspond with the predetermined blocks of pixels, but in other embodiments it does not.

Referring back to FIG. 3 again, the output of the motion estimation component (304) is provided to a component (306) that determines if the sum of absolute differences (SAD) is a above a threshold. How well a block in $x_i$ matches with a block in $x_{i-1}$ is determined by the sum of absolute differences (SAD) of the pixel pairs in the blocks in $x_i$ and $x_{i-1}$. A lower SAD value means a better match of the block with a block in image $x_{i-1}$. In some embodiments, component (306) may sum all SAD values of all blocks in the image. The resulting value may be used to measure temporal consistency. A lower sum of all SAD values means a higher temporal consistency, in some embodiments. A higher sum of all SAD values means a lower temporal consistency, in these embodiments. By comparing this sum of all SAD values against a threshold, one can detect temporal consistency.

The output of component (306) is provided to component (308) which measures temporal inconsistency frequency to determine if there is an attack. Component (308) in turn outputs an attack determination. For any given image $x_i$, component (306) determines sum all SAD values of all blocks in the image $x_i$ versus the blocks in previous anchor frame $x_{i-1}$. In some embodiments, if these SAD values are above a threshold, which means lower temporal consistency, component (306) provides this determination to component (308). Component (308) measures temporal inconsistency frequency by, for example, determining if enough images have SAD values that are above the threshold within a given period of time. If component (308) determines that there is temporal inconsistency frequency, then component (308) determines that attack is occurring.

Component (308) can provide this determination that an attack is occurring to, for example, a particular security management component. The security management component might be part of the same organization that provides the ML model (312), in some embodiments. Either the security management component, or the system of FIG. 3 itself, (such as component (308)) may take a responsive action in some embodiments. The responsive actions may be, for example, lowering the accuracy of the inference, lowering the speed of the inference, or signalling a backend service that it under attack, depending on the embodiment.

For example, in response to detecting as determination that there is temporal inconsistency frequency, the security management component may return a random output to the input $x_i$, instead of a correct output $y_i$. In addition, to prevent an attacker from learning that random outputs are being returned instead of the real outputs, the random outputs may be "smoothed" so that a difference in the values of generated consecutive random outputs is reduced. This prevents the random outputs from being wildly different from one random output to the next, and thus alerting an attacker.

As another example, to make copying of the model more difficult, the particular security management component may slow the speed of the classification, object detection, segmentation, etc. functions of component (310) of the ML model (312), in some embodiments. This slowing might be done for the current query, or for future queries to the model, depending on the embodiment. The slowing of the output predictions will make extraction of the model take significantly longer, thus increasing the effort and time to make a cloning attack. The more temporally inconsistent the input is, for example, the longer an attack might take. This might make the effort not worthwhile for the attacker.

These responsive actions are only examples of some responsive actions that might be implemented in response to a determination of temporal inconsistency frequency. Therefore, other responsive actions not mentioned here should not be construed as being precluded. In addition, in some embodiments the responsive actions might be implemented for the ML model (312) as a whole, without distinction about where the input is coming from. In other embodiments, the responsive actions might only be implemented for a user, IP address, or IP address range, from which temporal inconsistency frequency has been determined, such that those users or IP addresses that submit input within the PD of the ML model can still use the ML model.

Figure 5:
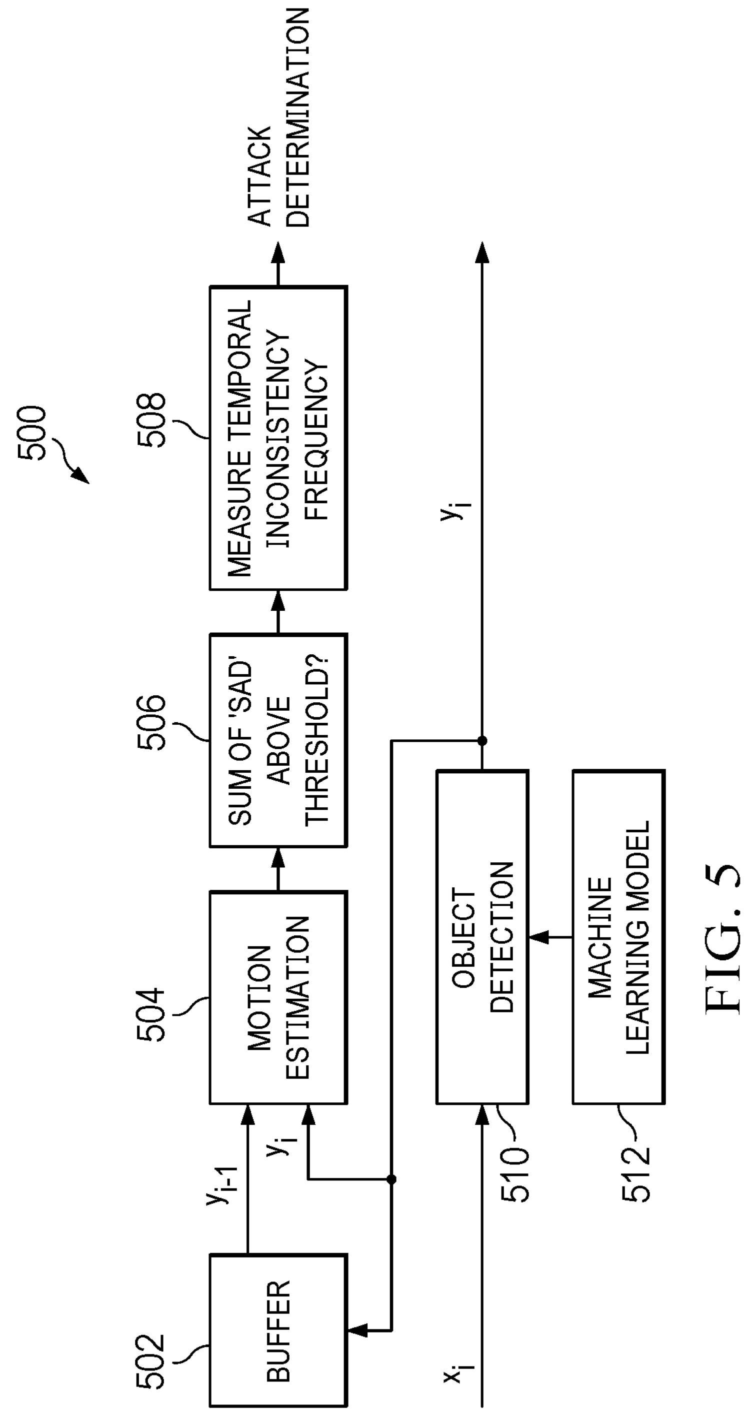
FIG. 5 depicts a second set of embodiments for protecting an ML model against extraction by applying motion estimation on detected objects in output $y_i$.

FIG. 5 depicts a second set of embodiments (500) for protecting an ML model (512) against extraction by applying motion estimation (504) on detected objects in output $y_i$. Just as motion estimation may be applied on the pixel blocks in input $x_i$, motion detection (504) may also be applied on detected objects in output $y_i$ of an object detector (510). In FIG. 5, the obtained input $x_i$ is provided to an object detection component (510) of an ML model (512). The object detection component (510) provides output $y_i$ which is a detection of objects within the input $x_i$.

This output $y_i$ may be, in turn, provided to a buffer (502) as well as a motion estimation component (504). The buffer in turn buffers the outputs $y_i$, such that it provides the output of the object detection component from the previous image $y_{i-1}$ to the motion estimation component (504). The motion estimation component may then compare the bounding boxes and classification of matching objects and produce a similar value as SAD in the first set of embodiments of FIG. 3. As in FIG. 3, component (506) can average all of these values for all detected objects in the image, and compare the resulting value against a threshold to compute the temporal consistency result for that image.

The output of component (506) is provided to component (508) which measures temporal inconsistency frequency to determine if there is an attack. Component (508) in turn outputs an attack determination. For any given image $x_i$, component (506) determines sum all SAD values for all detected objects $y_i$ in the image $x_i$, versus the detected objects $y_{i-1}$ in previous image $x_{i-1}$.

In some embodiments, if these SAD values are above a threshold, which means lower temporal consistency, component (506) provides this determination to component (508). Component (508) measures temporal inconsistency frequency by, for example, determining if enough images have SAD values that are above the threshold within a given period of time. If component (508) determines that there is temporal inconsistency frequency, then component (508) determines that attack is occurring. Component (508) can provide this determination that an attack is occurring to, for example, the security management component that was previously described.

Figure 6:
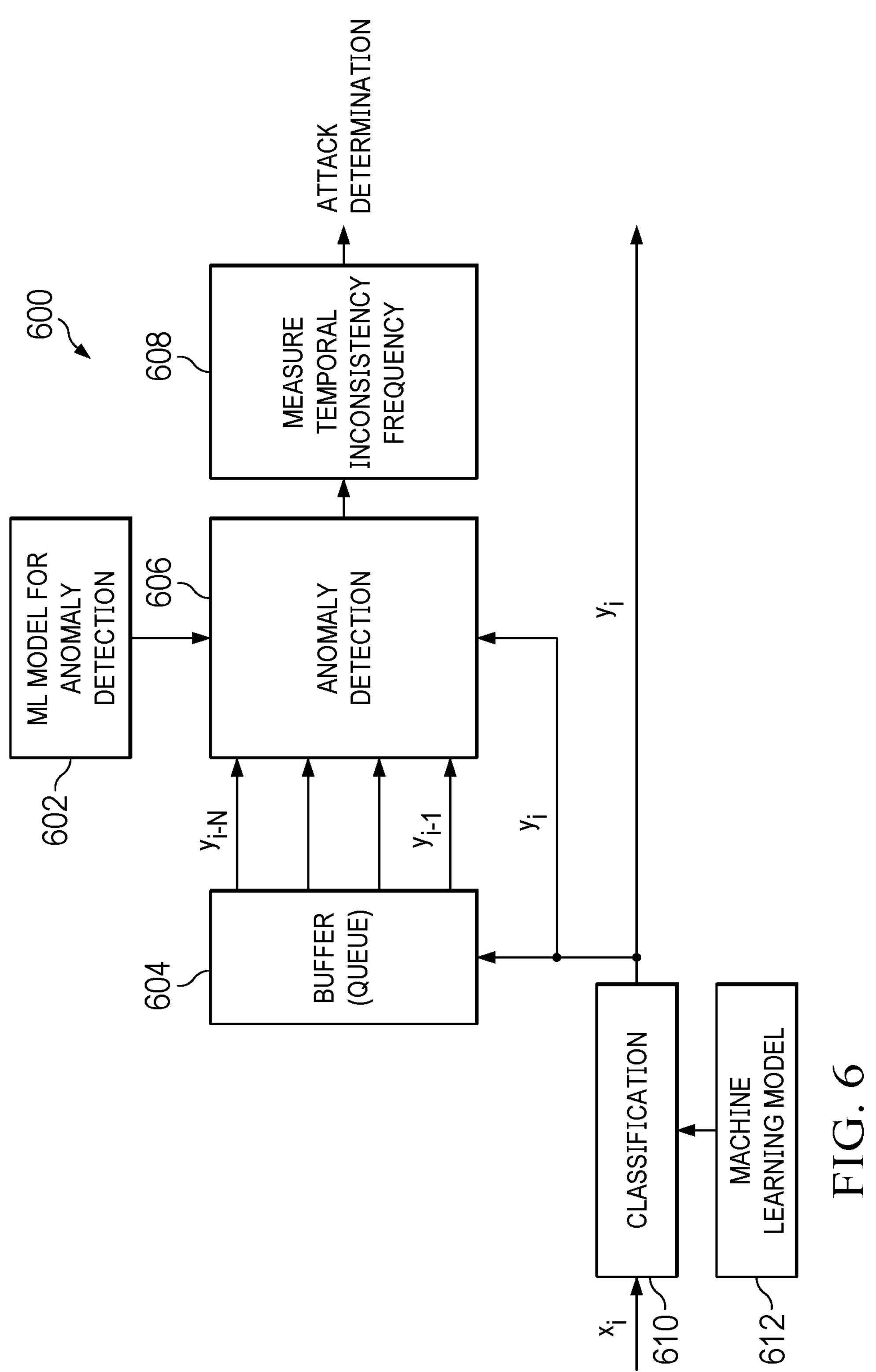
FIG. 6 depicts a third set of embodiments for protecting an ML model against extraction by applying anomaly detection on classified images in output $y_i$.

FIG. 6 depicts a third set of embodiments (600) for protecting an ML model (612) against extraction by applying anomaly detection (606) on classified images in output $y_i$. In these embodiments the ML model (612) is specifically used for classification (610).

Particularly, the classification (610) receives an input $x_i$ and outputs a classification result $y_i$. The classification result may then also be provided to a buffer or queue (604) and to an anomaly detection component (606). The buffer or queue (604) may buffer the previous classification results of the previous N inputs. The queue or buffer (604) can provide all these previous N classification results to the anomaly detection component (606), such that the anomaly detection component (606) can operate on all classification results from $y_{i-N}$ to $y_i$. Therefore, in some embodiments, anomaly detection may be applied by the anomaly detection component (606) on N consecutive classification results, $y_{i-N}, \ldots y_i$.

Anomaly detection (which may also be referred to as outlier detection and novelty detection) may be understood to be, in some embodiments, the identification of rare items, events, or observations which deviate significantly from the majority of the data or do not conform to a well-defined notion of normal behavior. Such examples may arouse suspicions of being generated by a different mechanism, or appear inconsistent with the remainder of that set of data, in some embodiments. Anomaly detection can find application in many domains including ML, cyber security, medicine, machine vision, statistics, neuroscience, law enforcement and financial fraud to name only a few.

Anomalies may be initially searched for clear rejection or omission from data to aid statistical analysis, for example, to compute the mean or standard deviation. Anomalies may also be removed to make better predictions from models such as linear regression, and more recently their removal aids the performance of ML algorithms. However, in many applications, anomalies themselves are of interest and are the observations most desirous in the entire data set, which need to be identified and separated from noise or irrelevant outliers.

Three broad categories of anomaly detection techniques may be used the anomaly detection component (606), depending on the embodiment: supervised anomaly detection, semi-supervised anomaly detection, and unsupervised anomaly detection. Supervised anomaly detection techniques require a data set that has been labeled as "normal" and "abnormal" and involves training a classifier. Semi-supervised anomaly detection techniques may assume that some portion of the data is labelled. This may be any combination of the normal or anomalous data. In some embodiments, the techniques construct a model representing normal behavior from a given normal training data set, and then test the likelihood of a test instance to be generated by the model. Finally, unsupervised anomaly detection techniques assume the data is unlabeled.

The ML model for anomaly detection (602), and the corresponding anomaly detection component(606), can operate on one or more of many different kinds of anomalies, depending on the embodiments. In some embodiments, an anomaly might be an outlier that is an observation which deviates so much from the other observations as to arouse suspicions that it was generated by a different mechanism. Additionally, or alternatively, an anomalies might be instances or collections of data that occur very rarely in the data set and whose features differ significantly from most of the data. Additionally, or alternatively, an anomaly is an observation (or subset of observations) which appears to be inconsistent with the remainder of that set of data. Additionally, or alternatively, an anomaly is a point or collection of points that is relatively distant from other points in multi-dimensional space of features. Additionally, or alternatively, anomalies are patterns in data that do not conform to a well-defined notion of normal behavior. Additionally, or alternatively, an anomaly may be defined by letting T be observations from a univariate Gaussian distribution, and O be a point from T. Then the z-score for O is greater than a pre-selected threshold if and only if O is an anomaly.

Anomaly detection (606) based on an ML for anomaly detection (602) may be applied on the N consecutive classification results, $y_{i-N}, \ldots y_i$. If no anomaly is detected, then temporal consistency may be concluded. If an anomaly is detected, then temporal inconsistency for that input $x_i$ might be concluded. For example, this could be an anomaly for some ML models (602): $y_i$=cat, $y_{i-1}$=plane and $y_{i-2}$=car. However, for other ML models (602), $y_i$=truck, $y_{i-1}$=truck, $y_{i-2}$=car could be normal behaviour. The ML model (602) used for the anomaly detection (606) may be trained after the ML model (612) that it protects has been trained, in some embodiments.

The output of anomaly detection component (606) is provided to component (608) which measures temporal inconsistency frequency to determine if there is an attack. Component (608) in turn outputs an attack determination. For any given image $x_i$ and its corresponding classification $y_i$, anomaly detection component (606) may determine, in some embodiments, if an anomaly is detected for the N consecutive classification results, $y_{i-N}, \ldots y_i$.

In some embodiments, if an anomaly is detected, which might indicate temporal inconsistency, anomaly detection component (606) provides this determination to component (608). Component (608) measures temporal inconsistency frequency by, for example, determining if enough classified images have enough anomalies detected within a given period of time. If component (608) determines that there is temporal inconsistency frequency, then component (608) determines might determine that attack is occurring, in some embodiments. Component (608) can provide this determination that an attack is occurring to, for example, the security management component that was previously described.

In any of the three sets of embodiments as described in FIGS. 3, 5, and 6 where temporal consistency is measured, it may be expected that in the normal case temporal inconsistency will be measured infrequently. However, in the case of the ML model being under an API attack, temporal inconsistency might be measured more frequently, if not continuously.

The frequency may be determined and used by an algorithm of the respective measure temporal inconsistency frequency components (308, 508, 608) to decide whether an API attack is likely, in some embodiments. If an attack is likely, the system may respond to prevent the attack by any one or more of these or other options: (1) lowering the accuracy of the inference by giving wrong results on purpose, (2) slowing down the inference so that an attack would take very long, or (3) informing a back-end service via a network connection that the device is under an API attack.

The parameters of the systems as described in FIGS. 3, 5, and 6 may be designed, in some embodiments, such that under normal circumstances about one out of M inputs is flagged as temporally inconsistent. In these normal circumstances, the systems in FIGS. 3, 5, and 6 may conclude that an API attack is not preset, in these embodiments.

If more than one out of M inputs is flagged as temporally inconsistent, then the systems in FIGS. 3, 5, and 6 may conclude that an API attack is present, in these embodiments. Therefore, an attacker could, for example, work around these proposed countermeasures by repeating every input that the attacker uses for his/her attack M times. In this example, an attacker can then stay under the detection radar. However, the expectation of these embodiments is that if M is sufficiently large, repeating every input M times will delay the attack so much that it becomes too costly to execute.

Example Computer System for Protecting an ML Model Against Extraction

Figure 7:
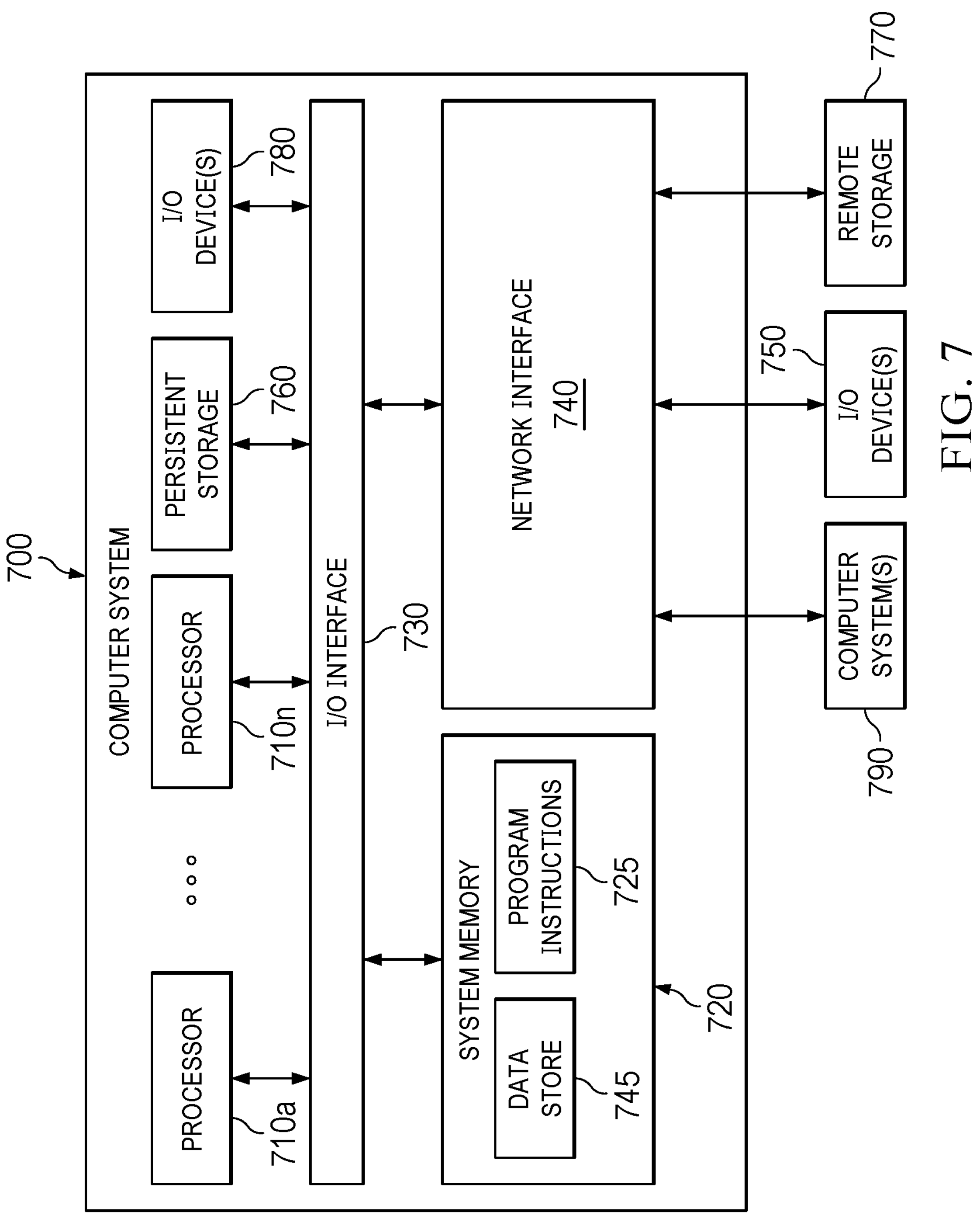
FIG. 7 is a block diagram illustrating an example computer system, according to various embodiments.

Embodiments of protecting an ML model against extraction as described herein may be executed on one or more computer systems, which may interact with various other devices. FIG. 7 is a block diagram illustrating an example computer system, according to various embodiments. For example, computer system 700 may be configured to implement nodes of a provider network, such as may implement various resources, a control plane, or diagnostic agents, and/or a client, in different embodiments. Computer system 700 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device, compute node, or computing node.

Computer system 700 includes one or more processors 710 (any of which may include multiple cores, which may be single or multi-threaded) coupled to a system memory 720 via an input/output (I/O) interface 730. Computer system 700 further includes a network interface 740 coupled to I/O interface 730. In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA. The computer system 700 also includes one or more network communication devices (e.g., network interface 740) for communicating with other systems and/or components over a communications network (e.g. Internet, LAN, etc.). For example, a client application executing on system 700 may use network interface 740 to communicate with a server application executing on a single server or on a cluster of servers that implement one or more of the components of the system described herein. In another example, an instance of a server application executing on computer system 700 may use network interface 740 to communicate with other instances of the server application (or another server application) that may be implemented on other computer systems (e.g., computer systems 790).

In the illustrated embodiment, computer system 700 also includes one or more persistent storage devices 760 and/or one or more I/O devices 780. In various embodiments, persistent storage devices 760 may correspond to disk drives, tape drives, solid state memory, other mass storage devices, or any other persistent storage device. Computer system 700 (or a distributed application or operating system operating thereon) may store instructions and/or data in persistent storage devices 760, as desired, and may retrieve the stored instruction and/or data as needed. For example, in some embodiments, computer system 700 may host a storage system server node, and persistent storage 760 may include the SSDs attached to that server node.

Computer system 700 includes one or more system memories 720 that are configured to store instructions and data accessible by processor(s) 710. In various embodiments, system memories 720 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 720 may contain program instructions 725 that are executable by processor(s) 710 to implement the methods and techniques described herein. In various embodiments, program instructions 725 may be encoded in platform native binary, any interpreted language such as Java™ byte-code, or in any other language such as C/C++, Java™, etc., or in any combination thereof. For example, in the illustrated embodiment, program instructions 725 include program instructions executable to implement the functionality of protecting an ML model against extraction, in different embodiments. In some embodiments, program instructions 725 may implement multiple separate clients, nodes, and/or other components.

In some embodiments, program instructions 725 may include instructions executable to implement an operating system (not shown), which may be any of various operating systems, such as UNIX, LINUX, Solaris™, MacOS™, Windows™, etc. Any or all of program instructions 725 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 700 via I/O interface 730. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 740.

In some embodiments, system memory 720 may include data store 745, which may be configured as described herein. In general, system memory 720 (e.g., data store 745 within system memory 720), persistent storage 760, and/or remote storage 770 may store data blocks, replicas of data blocks, metadata associated with data blocks and/or their state, configuration information, and/or any other information usable in implementing the methods and techniques described herein.

In an embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as other computer systems 790 (which may implement one or more nodes, endpoints, systems, or services internal to or external to a provider network, and/or clients of the provider network described herein), for example. In addition, network interface 740 may be configured to allow communication between computer system 700 and various I/O devices 750 and/or remote storage 770. Input/output devices 750 may, in some embodiments, include one or more display terminals, keyboards, keypads, touchpads, scanning devices, voice or optical recognition devices, or any other devices suitable for entering or retrieving data by one or more computer systems 700. Multiple input/output devices 750 may be present in computer system 700 or may be distributed on various nodes of a distributed system that includes computer system 700. In some embodiments, similar input/output devices may be separate from computer system 700 and may interact with one or more nodes of a distributed system that includes computer system 700 through a wired or wireless connection, such as over network interface 740. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol. In various embodiments, computer system 700 may include more, fewer, or different components than those illustrated in FIG. 7 (e.g., displays, video cards, audio cards, peripheral devices, other network interfaces such as an ATM interface, an Ethernet interface, a Frame Relay interface, etc.).

The components of the computer system 700 may for example be implemented on a single chip. The computer system 700 may be a chip card (or a chip card module) powered by direct electrical contact or through an electromagnetic field. The computer system 700 may be a fixed circuit or based on reconfigurable hardware (e.g., Field Programmable Gate Array, FPGA). The computer system 700 may be coupled to a personal computer, microcontroller, FPGA or a smart phone System on a Chip (SoC) or other components of a smart phone. The computer system 700 may be a chip that acts as Trusted Platform Module (TPM) offering functionality (secure storage, secure time, signature generation and validation, attestation) according to a standardized interface to a computer, smart phone, Internet of Things (IoT) device, or car.

It is noted that any of the distributed system embodiments described herein, or any of their components, may also be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

As such, systems and methods for protecting a machine learning (ML) model from extraction have been described. In an illustrative, non-limiting embodiment, a method may include: obtaining a plurality of input samples usable as part of an inference operation, wherein the inference operation is performed through execution of a machine learning (ML) model. The method may further include obtaining a plurality of outputs from the inference operation. The method may further include detecting a temporal inconsistency among at least one of: (a) the plurality of input samples, or (b) the plurality of outputs. Finally, the method may further include identifying an attempt to extract the ML model, based at least in part upon the determination.

The method may further include performing a responsive action in response to the attempt to extract the ML model, in some embodiments. In some of these embodiments, the responsive action comprises informing a back-end service via a network connection that the ML model is under an attack. In some embodiments, the responsive action comprises reducing an accuracy of the inference operations. In some embodiments, the responsive action comprises reducing a speed of the inference operations. In some embodiments, the responsive action comprises returning at least one random output for at least one of the plurality of input samples. In some embodiments, the method may further include reducing a difference between values of consecutive random outputs corresponding to the plurality of input samples.

In some embodiments, the detecting the temporal inconsistency of the method may further include estimating a motion of groups of pixels from a given input sample to a next successive input sample; determining a sum of absolute differences (SAD) for at least some of the groups of pixels between the given input sample and the next successive input sample; and detecting the temporal inconsistency based, at least in part on the SAD being above a threshold.

In some embodiments, the plurality of outputs comprise a plurality of detected objects of an object detector, and the detecting the temporal inconsistency of the method may further include: estimating motion of at least some of the plurality of detected objects from a given output of the plurality of outputs to a next successive output of the plurality of outputs; determining a sum of absolute differences (SAD) for the at least some of the detected objects between the given output and the next successive output; and detecting the temporal inconsistency based, at least in part on the SAD being above a threshold.

In some embodiments, the plurality of outputs from the inference operations of the ML model comprise a plurality of classification results, and the detecting the temporal inconsistency of the method may further include: detecting, by a second machine learning model for anomaly detection, at least one anomaly in the plurality of classification results; and determining that the plurality of classification results are temporally inconsistent based, at least in part, on the detected at least one anomaly. In some embodiments, identifying the attempt further includes determining that the attempt is underway based, at least in part, in response to the temporal inconsistency being above a threshold.

Other embodiments encompass a system that includes a processor; and a memory coupled to the processor, the memory having program instructions stored thereon that, upon execution by the processor, cause the system to: deploy a machine learning (ML) model configured to (a) obtain a plurality of successive input samples for inference operations, and (b) provide a plurality of outputs from the inference operations corresponding to the plurality of inputs; determine that the plurality of input samples or the plurality of outputs are temporally inconsistent; and based at least in part on the determination of temporal inconsistency, determine that an attempt to copy the ML model is underway.

In order to determine that the plurality of input samples or the plurality of outputs are temporally inconsistent, for some embodiments of the system, the program instructions, upon execution by the processor, further cause the system to: estimate motion of groups of pixels from a given input sample of the plurality of input samples to a next successive input sample of the plurality of input samples; determine a sum of absolute differences (SAD) for at least some of the groups of pixels between the given input sample and the next successive input sample; and detect the temporal inconsistency based, at least in part, upon the SAD being greater than a threshold.

In some embodiments of the system, the plurality of outputs from the inference operations of the ML model include a plurality of detected objects of an object detector. In some of these embodiments, in order to determine that the plurality of input samples or the plurality of outputs are temporally inconsistent, the program instructions, upon execution by the processor, further cause the system to: estimate motion of at least some of the plurality of detected objects from a given output of the plurality of outputs to a next successive output of the plurality of outputs; determine a sum of absolute differences (SAD) for the at least some of the detected objects between the given output and the next successive output; and detect the temporal inconsistency based, at least in part, upon the SAD being greater than a threshold.

In some embodiments of the system, the plurality of outputs from the inference operations of the ML model comprise a plurality of classification results. In some of these embodiments, the program instructions, upon execution by the processor, further cause the system to detect the temporal inconsistency based, at least in part, upon an anomaly in the plurality of classification results, where the anomaly is detected using a second ML model. In some embodiments, the program instructions, upon execution by the processor, further cause the system to: inform a back-end service via a network connection that the ML model is under an attack; lower the accuracy of the inference operations of the ML model; slow the speed of the inference operations of the ML model; or return at least one random output for at least one of the plurality of successive input samples, depending on the embodiment.

In some embodiments, a hardware memory having program instructions stored thereon that, upon execution by a computing device, cause the computing device to: obtain a plurality of successive input samples for inference operations of a machine learning (ML) model; obtain a plurality of outputs from the inference operations of the ML model corresponding to the plurality of inputs; determine that either the plurality of input samples or the plurality of outputs are temporally inconsistent; and based at least in part on the determination of temporal inconsistency, determine that an attempt to copy the ML model is underway.

In some of these embodiments, in order to determine that either the plurality of input samples or the plurality of outputs are temporally inconsistent, the program instructions further cause the computing device to: estimate motion of groups of pixels from a given input sample of the plurality of input samples to a next successive input sample of the plurality of input samples; determine a sum of absolute differences (SAD) for at least some of the groups of pixels between the given input sample and the next successive input sample; and detect temporal inconsistency based, at least in part, upon the SAD being above a threshold.

In some embodiments involving the hardware memory, the plurality of outputs from the inference operations of the ML model comprise a plurality of detected objects of an object detector. In some of these embodiments, in order to determine that either the plurality of input samples or the plurality of outputs are temporally inconsistent, the program instructions further cause the computing device to: estimate motion of at least some of the plurality of detected objects from a given output of the plurality of outputs to a next successive output of the plurality of outputs; determine a sum of absolute differences (SAD) for the at least some of the detected objects between the given output and the next successive output; and detect the temporal inconsistency based, at least in part, upon the SAD being above a threshold.

In some embodiments involving the hardware memory, the plurality of outputs from the inference operations of the ML model comprise a plurality of classification results. In some of these embodiments, in order to determine that either the plurality of input samples or the plurality of outputs are temporally inconsistent, the program instructions further cause the computing device to: detect, by a second ML model, at least one anomaly in the plurality of classification results; and determine that the plurality of classification results are temporally inconsistent based, at least in part, upon the at least one anomaly.

While the majority of the presented embodiments use image data as input data, other embodiments can also be applied on other kinds of data that is used for ML. For example, other embodiments may be used on sound data. In some embodiments using sound data, the PD sound data is temporally consistent such that one block of sound data is consistent with its corresponding temporal neighbor blocks of sound data. In many embodiments, the input data may be any kind of data where temporal consistency is measured between successive data inputs. If inconsistencies are frequently detected, in some of these embodiments, then an API attack is assumed.

In various embodiments, systems and methods described herein may provide hardware-integrated, priority-encoded domains in a System-On-a-Chip (SoC), Field-Programmable Gate Array (FPGA), Application-Specific Integrated Circuit (ASIC), or any other suitable data processing system comprising a plurality of discrete circuits or semiconductor Intellectual Property (IP) cores (collectively referred to as “SoC devices” or simply “devices”) disposed in a single electronic or semiconductor package.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow. It is intended that the following claims be interpreted to embrace all such modifications and changes and, accordingly, the above description to be regarded in an illustrative rather than a restrictive sense.

The previous detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure may be combined with one or more other aspects of this disclosure to form new aspects.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, Internet-of-Things (IoT) devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. The examples described herein may be realized as instructions processed by a processing device like a personal computer, microcontroller, smart card, secure microcontroller, hardware root of trust, (embedded) secure element ("ESE"), Trusted Platform Module ("TPM"), or Hardware Security Module ("HSM"). More generally, these systems and methods may be incorporated into any device or system having one or more electronic parts or components.

For sake of brevity, conventional techniques related to signal processing, sampling, sensing, analog-to-digital conversion, computer architecture, and PWM, have not been described in detail herein. Furthermore, the connecting lines shown in the various figures contained herein have been intended to illustrate relationships (e.g., logical) or physical couplings (e.g., electrical) between the various elements. It should be noted, however, that alternative relationships and connections may be used in other embodiments. Moreover, circuitry described herein may be implemented either in silicon or another semiconductor material or alternatively by software code representation thereof.

Although the invention(s) are described herein with reference to specific embodiments, various modifications and changes may be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Reference is made herein to "configuring" a device or a device "configured to" perform some operation(s). It should be understood that this may include selecting predefined circuits or logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A method comprising:

obtaining a plurality of input samples usable as part of an inference operation, wherein the inference operation is performed through execution of a machine learning (ML) model;

obtaining a plurality of outputs from the inference operation;

detecting a temporal inconsistency among at least one of: (a) the plurality of input samples based on differences between successive input samples of the plurality of input samples, or (b) the plurality of outputs based on differences between successive outputs of the plurality of outputs, wherein detecting the temporal inconsistency includes:

determining when the successive input samples have no content-based relationship;

determining temporal differences in content between samples of one of the successive input samples or the successive outputs; and determining a count exceeds a threshold, the count indicates how often the temporal differences between samples of the successive input samples are less than a temporal threshold; and based at least in part upon the detecting of the temporal inconsistency, identifying an attempt to extract the ML model.

2. The method of claim 1, further comprising performing a responsive action in response to the attempt.

3. The method of claim 2, wherein the responsive action comprises informing a back-end service via a network connection that the ML model is under an attack.

4. The method of claim 2, wherein the responsive action comprises reducing an accuracy of the inference operations.

5. The method of claim 2, wherein the responsive action comprises reducing a speed of the inference operations.

6. The method of claim 2, wherein the responsive action comprises returning at least one random output for at least one of the plurality of input samples.

7. The method of claim 6, further comprising reducing a difference between values of consecutive random outputs corresponding to the plurality of input samples.

8. The method of claim 1, wherein the detecting further comprises:

estimating a motion of groups of pixels from a given input sample to a next successive input sample of the successive input samples;

determining a sum of absolute differences (SAD) for at least some of the groups of pixels between the given input sample and the next successive input sample; and detecting the temporal inconsistency based, at least in part, on the SAD exceeding a threshold.

9. The method of claim 1, wherein the plurality of outputs comprises a plurality of detected objects of an object detector, and wherein the detecting further comprises:

estimating motion of at least some of the plurality of detected objects from a given output of the plurality of outputs to a next successive output of the plurality of outputs;

determining a sum of absolute differences (SAD) for the at least some of the detected objects between the given output and the next successive output of the successive outputs; and detecting the temporal inconsistency based, at least in part, on the SAD exceeding a threshold.

10. The method of claim 1, wherein the plurality of outputs from the inference operations of the ML model comprise a plurality of classification results, and wherein the detecting further comprises:

detecting, by a second machine learning model configured for anomaly detection, at least one anomaly in the plurality of classification results; and determining that the plurality of classification results are temporally inconsistent based, at least in part, on the detected at least one anomaly.

11. The method of claim 1, wherein identifying the attempt further comprises determining that the attempt is underway based, at least in part, in response to the temporal inconsistency being above a threshold.

12. A system comprising:

a processor; and a memory coupled to the processor, the memory having program instructions stored thereon that, upon execution by the processor, cause the processor to:

deploy a machine learning (ML) model configured to (a) obtain a plurality of successive input samples for inference operations, and (b) provide a plurality of outputs from the inference operations corresponding to the plurality of inputs;

determine temporal inconsistency from one of the plurality of input samples or the plurality of outputs based on differences in content between successive input samples of the plurality of input samples or successive outputs of the plurality of outputs; and based at least in part on the determination of temporal inconsistency, determine that an attempt to copy the ML model is underway;

wherein the processor is configured to:

determine when the successive input samples have no content-based relationship;

determine temporal differences in content between samples of one of the successive input samples or the successive outputs; and determine a count exceeds a threshold, the count indicates how often the temporal differences between samples of the successive input samples are less than a temporal threshold.

13. The system of claim 12, wherein to determine that the plurality of input samples or the plurality of outputs are temporally inconsistent, the program instructions, upon execution by the processor, further cause the processor to:

estimate motion of groups of pixels from a given input sample of the plurality of input samples to a next successive input sample of the plurality of input samples;

determine a sum of absolute differences (SAD) for at least some of the groups of pixels between the given input sample and the next successive input sample of the successive input samples; and detect the temporal inconsistency based, at least in part, upon the SAD being greater than a threshold.

14. The system of claim 12, wherein the plurality of outputs from the inference operations of the ML model comprise a plurality of detected objects of an object detector, and wherein to determine that the plurality of input samples or the plurality of outputs are temporally inconsistent, the program instructions, upon execution by the processor, further cause the processor to:

estimate motion of at least some of the plurality of detected objects from a given output of the plurality of outputs to a next successive output of the plurality of outputs;

determine a sum of absolute differences (SAD) for the at least some of the detected objects between the given output and the next successive output of the successive outputs; and detect the temporal inconsistency based, at least in part, upon the SAD being greater than a threshold.

15. The system of claim 12, wherein the plurality of outputs from the inference operations of the ML model comprise a plurality of classification results, and wherein the program instructions, upon execution by the processor, further cause the processor to detect the temporal inconsistency based, at least in part, upon an anomaly in the plurality of classification results, wherein the anomaly is detected using a second ML model.

16. The system of claim 12, the program instructions, upon execution by the processor, further cause the processor to:

inform a back-end service via a network connection that the ML model is under an attack;

lower the accuracy of the inference operations of the ML model;

slow the speed of the inference operations of the ML model; or return at least one random output for at least one of the plurality of successive input samples.

17. A hardware memory having program instructions stored thereon that, upon execution by a processor of a computing device, cause the processor to:

obtain a plurality of successive input samples for inference operations of a machine learning (ML) model;

obtain a plurality of outputs from the inference operations of the ML model corresponding to the plurality of inputs;

determine that either the plurality of input samples or the plurality of outputs are temporally inconsistent based on one or more of differences between input samples of the plurality of input samples or differences between outputs of the plurality of outputs; and based at least in part on the determination of temporal inconsistency, determine that an attempt to copy the ML model is underway;

wherein the instructions cause the processor to:

determine when the input samples have no content-based relationship;

determine temporal differences in content between samples of one of the input samples or the outputs; and determine a count exceeds a threshold, the count indicates how often the temporal differences between samples of the input samples are less than a temporal threshold.

18. The hardware memory of claim 17, wherein to determine that either the plurality of input samples or the plurality of outputs are temporally inconsistent, the program instructions further cause the processor to:

estimate motion of groups of pixels from a given input sample of the plurality of input samples to a next successive input sample of the plurality of input samples;

determine a sum of absolute differences (SAD) for at least some of the groups of pixels between the given input sample and the next successive input sample; and detect temporal inconsistency based, at least in part, upon the SAD being above a threshold.

19. The hardware memory of claim 17, wherein the plurality of outputs from the inference operations of the ML model comprise a plurality of detected objects of an object detector, and wherein to determine that either the plurality of input samples or the plurality of outputs are temporally inconsistent, the program instructions further cause the processor to:

estimate motion of at least some of the plurality of detected objects from a given output of the plurality of outputs to a next successive output of the plurality of outputs;

determine a sum of absolute differences (SAD) for the at least some of the detected objects between the given output and the next successive output; and detect the temporal inconsistency based, at least in part, upon the SAD being above a threshold.

20. The hardware memory of claim 17, wherein the plurality of outputs from the inference operations of the ML model comprise a plurality of classification results, and wherein to determine that either the plurality of input samples or the plurality of outputs are temporally inconsistent, the program instructions further cause the processor to:

detect, by a second ML model, at least one anomaly in the plurality of classification results; and determine that the plurality of classification results are temporally inconsistent based, at least in part, upon the at least one anomaly.

* * * * *